United States Patent
Jüstel et al.

(10) Patent No.: US 8,173,230 B2
(45) Date of Patent: May 8, 2012

(54) FLUORESCENT LAMP HAVING A UVB PHOSPHOR

(75) Inventors: Thomas Jüstel, Witten (DE); Walter Mayr, Alsdorf (DE); Peter J. Schmidt, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1022 days.

(21) Appl. No.: 10/555,394

(22) PCT Filed: Apr. 23, 2004

(86) PCT No.: PCT/IB2004/050495
§ 371 (c)(1),
(2), (4) Date: Feb. 8, 2008

(87) PCT Pub. No.: WO2004/099341
PCT Pub. Date: Nov. 18, 2004

(65) Prior Publication Data
US 2008/0138652 A1    Jun. 12, 2008

(30) Foreign Application Priority Data
May 6, 2003    (EP) .................................. 03101256

(51) Int. Cl.
*A47G 19/22*    (2006.01)
*B32B 15/00*    (2006.01)
*B32B 9/00*    (2006.01)
*C09K 11/08*    (2006.01)
*G01J 1/58*    (2006.01)
*H01J 1/62*    (2006.01)

(52) U.S. Cl. . 428/34.4; 428/432; 428/690; 252/301.4 P; 250/483.1; 313/486

(58) Field of Classification Search ................. 428/34.4, 428/432, 690; 252/301.4 P; 250/483.1; 313/486
See application file for complete search history.

(56) References Cited

U.S. PATENT DOCUMENTS

| | | | | |
|---|---|---|---|---|
| 2,915,664 A | * | 12/1959 | Lemmers | 313/493 |
| 3,507,804 A | * | 4/1970 | Ropp | 252/301.4 P |
| 4,859,903 A | * | 8/1989 | Minematu et al. | 313/487 |

FOREIGN PATENT DOCUMENTS
GB        1565811 A  *  4/1980
* cited by examiner

*Primary Examiner* — Rena Dye
*Assistant Examiner* — James Yager

(57) ABSTRACT

A UVB phosphor of the composition $(La_{1-x-y-z},Gd_x,Y_y)PO_4:Ce$, is described, in which x=0 to 0.5, y=0 to 0.5 and z=0.01 to 0.3 and the sum of x, y and z is less than 1. From a phosphor of this kind, a phosphor layer can be produced that, in fluorescent lamps based on low-pressure mercury discharge lamps, produces a spectrum of 5 UV light that is particularly well suited to the cosmetic or medical treatment of the skin.

2 Claims, 3 Drawing Sheets

FLUORESCENT LAMP HAVING A UVB PHOSPHOR

The invention relates to UVB phosphors having the general formula $(La_{1-x-y-z}Gd_xY_y)PO_4:Ce_z$. The invention also relates to the use of such UVB phosphors as phosphor layers in fluorescent lamps based on a low-pressure mercury discharge.

It is known that fluorescent lamps having one or two UV phosphors are widely used for cosmetic and medical purposes. In this way, tanning lamps for example, such as the ®CLEO Professional or the ®CLEO Advantage contain mixtures of UVA and UVB phosphors to generate a UV spectrum that meets all the technical and legal requirements. Known UVB phosphors are $SrAl_{12}O_{19}:Ce$ or $LaPO_4:Ce$.

A UVA phosphor that is widely used is $BaSi_2O_5:Pb$, on account of its high quantum yield when excited by light of a wavelength of 254 nm. This UVA phosphor largely determines the spectrum from the lamp, because the proportion that it represents by weight has to be of the order of 80 to 95% to give the desired lamp specification. A UVB phosphor is used to adjust the amount of UVB light (280 to 320 nm) to the Ery-B/Ery-A ratio that is important to give a natural tan.

In the conventional fluorescent lamps used for tanning the skin, the main problem is the relatively sharp decline in the light yield during the operating life of the lamp. This is caused chiefly by the $BaSi_2O_5:Pb$ UVA phosphor. Even though a wide variety of efforts have already been made to improve this phosphor, for example by applying it to $Al_2O_3$ as a particle coating, the sharp decline in the light yield is still a major obstacle to the development of lamps having a working life of more than 1000 hours. Despite all the efforts that have been made to date to improve the light yield of fluorescent lamps of this kind, there has been little change in this situation.

$BaSi_2O_5:Pb$ is subject to far more severe degradation than phosphors that are activated by rare earths, because the activator is susceptible to light-induced redox reactions. These result in a reduction in its yield of UVA light. By increasing the electrical power input to the lamps, the decline is even accelerated.

To allow the period of irradiation to be shortened, there is an increasingly large demand from customers for tanning lamps giving a high output of UV radiation, and because of the problem mentioned has been constantly gaining in significance over the past few years.

It has therefore been an object of the present invention to solve all these problems by using a new UVB phosphor that contains $Ce^{3+}$ as an activator, because $Ce^{3+}$ phosphors are more stable than $Pb^{2+}$ ones. It is true that certain $Ce^{3+}$ phosphors that emit UVA light are known from the literature, but their low efficiency has so far militated against their supplanting $BaSi_2O_5:Pb$.

The object is achieved by UVB phosphors having the composition $(La_{1-x-y-z}Gd_xY_y)PO_4:Ce$ in which x=0 to 0.5, y=0 to 0.5 and z=0.01 to 0.3 and the sum of x, y and z is less than 1. These UVB phosphors can be incorporated in a phosphor layer that can be used in UV lamps for cosmetic and medical purposes.

The phosphors mentioned have a wide $Ce^{3+}$ emission band similar to that found with $LaPO_4:Ce$. Compared with $LaPO_4:Ce$, the emission band of the compounds according to the invention is shifted towards a lower energy because the energy level splitting of the 5d orbital is greater. This gives a smaller distance in terms of energy between the 4f ground states and the lowest 5d excitation states. The splitting of the 5d orbital is determined by covalence effects and the strength of the crystal field, it being the case that the latter increases in the trivalent cation in the monacite due to the substitution of the smaller $Gd^{3+}$ for the $La^{3+}$.

However, the insertion of the $Gd^{3+}$ in the lattice also causes a 4f-4f($^6P_{7/2}$-$^8S$) emission at 311 nm, with the intensity of the $Gd^{3+}$ line emission being determined by the concentration of $Ce^{3+}$. If the $Ce^{3+}$ concentration is increased, the intensity of the emission of the $Gd^{3+}$ line decreases because of the transfer of energy from the $Gd^{3+}$ ($^6P_J$) state to the lowest 5d state of the Ce3+.

The substitution of $Gd^{3+}$ for $La^{3+}$ gives UVB phosphors that produce a much lower UVB content and thus a higher UVA content that the usual $LaPO_4:Ce$ or $SrAl_{12}O_{19}:Ce$ phosphors. Also, the ratio to one another of UVB and UVA can be adjusted, as Table 1 below shows.

TABLE 1

Proportions of UVB and UVA in the emission spectrum of single UVA phosphors and in the emission spectrum that is filtered by normal UVA lamp glass.

| Phosphor | λ max [nm] | UVB and UVA [%] | | UVB and UVA in normal lamp glass | | Loss factor |
|---|---|---|---|---|---|---|
| SrAl12O19:Ce | 285, 315 | 56 | 44 | 30 | 70 | 0.47 |
| LaPO4:Ce | 315, 335 | 38 | 62 | 21 | 79 | 0.60 |
| (La0.5Gd0.5)PO4:Ce | 320, 340 | 29 | 71 | 16 | 84 | 0.65 |
| (La0.25Gd0.75)PO4:Ce | 320, 345 | 24 | 76 | 13 | 87 | 0.69 |
| GdPO4:Ce | 320, 345 | 25 | 75 | 13 | 87 | 0.68 |
| BaSi2O5:Pb | 350 | 2 | 98 | 1 | 99 | 0.84 |

All the phosphors in Table 1 show high absorption and a high quantum efficiency at 254 and 185 nm, which is a prerequisite for-use in low-pressure mercury lamps. By the use of a mixture of a UVB phosphor such as, for example, $LaPO_4:Ce$ and a UVA phosphor such as, for example, $BaSi_2O_5:Pb$, the characteristics of a tanning lamp, such as, for example, the UVB/UVA, Ery-B/Ery-A and $UVA_1/UVA_2$ ratios, can be acted on to a considerable degree (FIG. 1 and FIG. 2).

The invention therefore also relates to a mixture of UV phosphors that comprises a UVB phosphor having the composition $(La_{1-x-y-z}Gd_xY_y)PO_4:Ce_z$, and also a UVA phosphor selected from the group comprising $LaB_3O_6:Bi,Gd$, $SrAl_{12}O_{19}:Ce$, $BaSi_2O_5:Pb$, $LaMgAl_{11}O_{19}:Ce$, $Sr_2MgSi_2O_7:Pb$ and $SrB_4O_7:Eu$.

The overall UV radiation emitted by a lamp for medical or tanning purposes, and the efficiency of the lamp, also depend on the transmission curve of the glass and the spectral energy distribution of the phosphors. Phosphors giving short-wave emission produce a low lamp efficiency because a considerable proportion of the UVB radiation, and particularly the high-energy components of the emission spectrum, is absorbed by the glass of the lamp. That has already been the reason for the replacement of $SrAl_{12}O_{19}:Ce$ with $LaPO_4:Ce$, a replacement that led to the development of lamps giving higher UV emission, namely to the CLEO Natural and Advantage UV lamps.

The loss of efficiency due to the absorption of UV in glass of the lamp can be further reduced by a further shift of the main emission wavelength of the UVB phosphor into the lower energy range. Higher efficiencies can be obtained for UV lamps in this way. Table 2 below gives the specifications of UV lamps as a function of the ratios by weight of the UVA and UVB phosphors used.

TABLE 2

Specification of a low-pressure mercury lamp containing two phosphors as a function of the ratios by weight of $(La_{0.25}Gd_{0.75})PO_4:Ce$ and $BaSi_2O_5:Pb$.

| $(La_{0.25}Gd_{0.75})PO_4:Ce$ [%] | $BaSi_2O_5:Pb$ [%] | $UVA_1/UVA_2$ [%] | UVB/UVA [%] | Ery-B/Ery-A [%] |
|---|---|---|---|---|
| 0 | 100 | 4.17 | 0.8 | 1.1 |
| 20 | 80 | 3.31 | 3.7 | 1.8 |
| 40 | 60 | 2.55 | 6.0 | 2.5 |
| 60 | 40 | 1.99 | 8.6 | 3.2 |
| 80 | 20 | 1.52 | 11.6 | 3.7 |
| 100 | 0 | 1.15 | 15.0 | 4.0 |

It can be seen from the above that phosphors having the formula $(La_{1-x-y-z}Gd_xY_y)PO_4:Ce_z$ provide new opportunities for the development of improved tanning lamps. They can also be used for medical lamps for treating psoriasis, vitiligo or acne vulgaris, because their emission spectrum contains a high proportion of emission at 311 nm if the $Ce^{3+}$ concentration is sufficiently small (less than 5%).

Standard psoriasis lamps (FIG. 6) are provided with the phosphor $LaB_3O_6:Bi,Gd$ (GLBB), where the $Gd^{3+}$ emission is sensitized by $Bi^{3+}$. However, because the energy transfer is not complete, the emission spectrum still shows, in addition to the $Gd^{3+}$ line emission at 311 nm, a wide $Bi^{3+}$ emission band between 280 and 450 nm (FIG. 5). The main problem with this phosphor however is its fast degradation due to its $Bi^{3+}$ content. A psoriasis lamp in which the $(La_{1-x-y-z}Gd_xY_y)PO_4:Ce_z$ phosphor according to the invention is used is therefore also advantageous because this phosphor shows far greater stability that GLBB.

So, to sum up, it can be said that a tanning lamp having the phosphor according to the invention has a greater tanning action due to its optimized emission spectrum (FIG. 3) and to the lower absorption of the emission by the glass of the lamp (FIG. 4) and also exhibits greater stability and thus a longer life than conventional UV lamps.

These and other aspects of the invention are apparent from and will be elucidated with reference to the embodiments described hereinafter.

EXAMPLE 1

Production of $(La_{0.5}Gd_{0.5})PO_4:2\%Ce$ 8.988 g of $La_2O_3$, 10 g of $Gd_2O_3$ and 0.978 g of $Ce(NO_3)_3(H_2O)_6$ are suspended in ethanol and 13.63 g of phosphoric acid (85%) is slowly added. The suspension obtained is stirred for 24 hours at ambient temperature. After the solvent has been removed with a rotary evaporator, the powder is dried at 100° C. and heated in air for an hour at 600° C. After that the powder is pulverized and 0.4 g of LiF is added, and it is then heated for 2×2 hours at 1,000° C. in an atmosphere of CO.

The phosphor powder is then washed in 160 ml of $HNO_3$ (65%) and then treated for 6 hours at 60° C. with 640 ml of water. The powder is then filtered off and washed until it is free of acid. Finally, it is dried at 100° C., pulverized and screened through a 36 μm screen.

The emission spectrum of the compound obtained shows a sharp line at 311 nm and two wide overlapping bands at 320 and 340 nm.

EXAMPLE 2

Production of $GdPO_4:20\%Ce$ 20 g of $Gd_2O_3$ and 11.979 g of $Ce(NO_3)_3(H_2O)_6$ are suspended in ethanol and 16.698 g of phosphoric acid (85%) is slowly added. The suspension obtained is stirred for 24 hours at ambient temperature. After the solvent has been removed in a rotary evaporator, the powder is dried at 100° C. and heated in air for an hour at 600° C. After that the powder is pulverized and 0.4 g of LiF is added, and it is then heated twice for 2 hours at 1,000° C. in an atmosphere of CO.

The phosphor is then washed in 160 ml of $HNO_3$ (65%) and treated for 6 hours at 60° C. with 640 ml of water. The powder is then filtered off and washed with water until it is free of acid. Finally, it is dried at 100° C., pulverized and screened through a 36 μm screen.

The emission spectrum of the compound obtained shows two wide overlapping bands peaking at 320 and 345 nm.

EXAMPLE 3

Fluorescent lamp having 40% of $(La_{0.25}Gd_{0.75})PO_4:2\%Ce$ and 60% of $BaSi_2O_5:Pb$ in standard glass ($T_{312.6\ nm}=35\%$)

A suspension of $BaSi_2O_5:Pb$ in butyl acetate is mixed with nitrocellulose as a binder. The suspension is then applied to the inside wall of a glass lamp-tube made of standard glass. The viscosity of the suspension is adjusted so that the layer of phosphor produced has a weight per unit area of 0.5 to 3 mg/cm².

After the coating process, the organic residues are removed by heating to 550 to 600° C. The lamp is then filled with a few mbars of argon and with 2 to 50 mg of mercury. Finally, the electrodes are inserted in the lamp and the lamp-tube is sealed.

Figure 1:
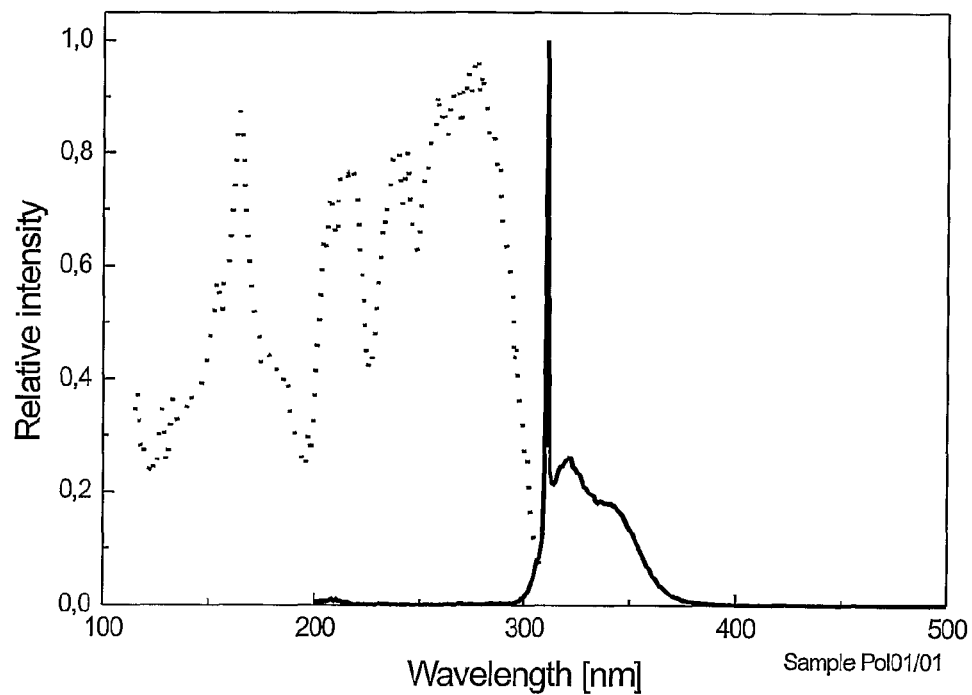
FIG. 1 shows the emission spectrum of a low-pressure mercury lamp containing a mixture of 40% of $(La_{0.25}Gd_{0.75})PO_4:Ce$ and 60% of $BaSi_2O_5:Pb$.

The emission spectrum of the lamp produced in this way is shown in FIG. 1.

EXAMPLE 4

Fluorescent Lamp having $(La_{0.25}Gd_{0.75})PO_4:Ce$ in standard glass ($T_{312.6}=35\%$)

Figure 2:
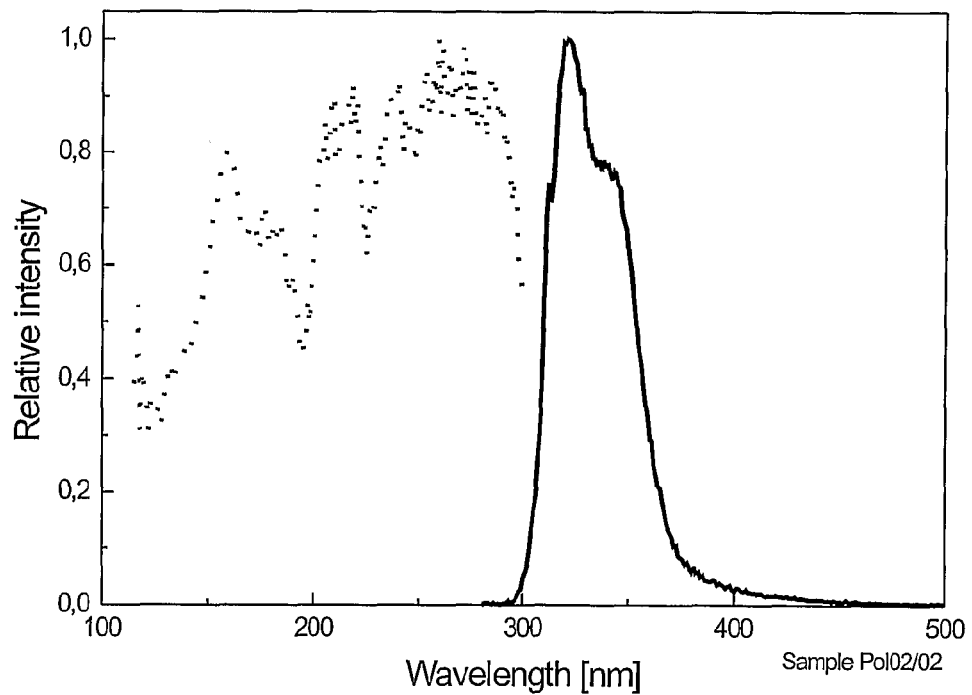
FIG. 2 shows the emission spectrum of a low-pressure mercury lamp containing $(La_{0.25}Gd_{0.75})PO_4:Ce$.
Figure 3:
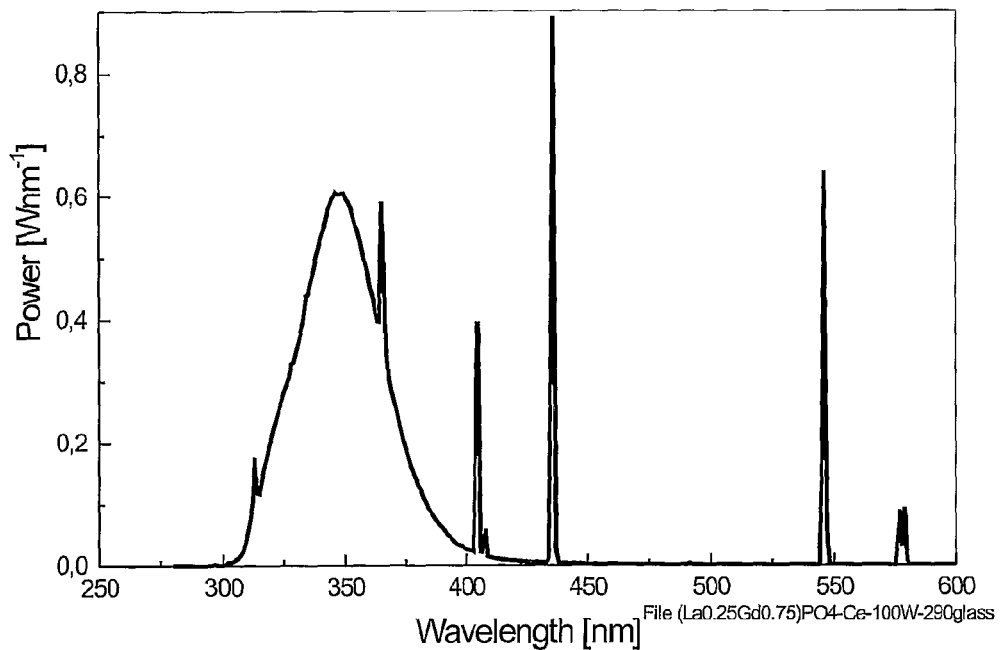
FIG. 3 shows the emission spectrum of UVA/B phosphors as shown in Table 1.
Figure 4:
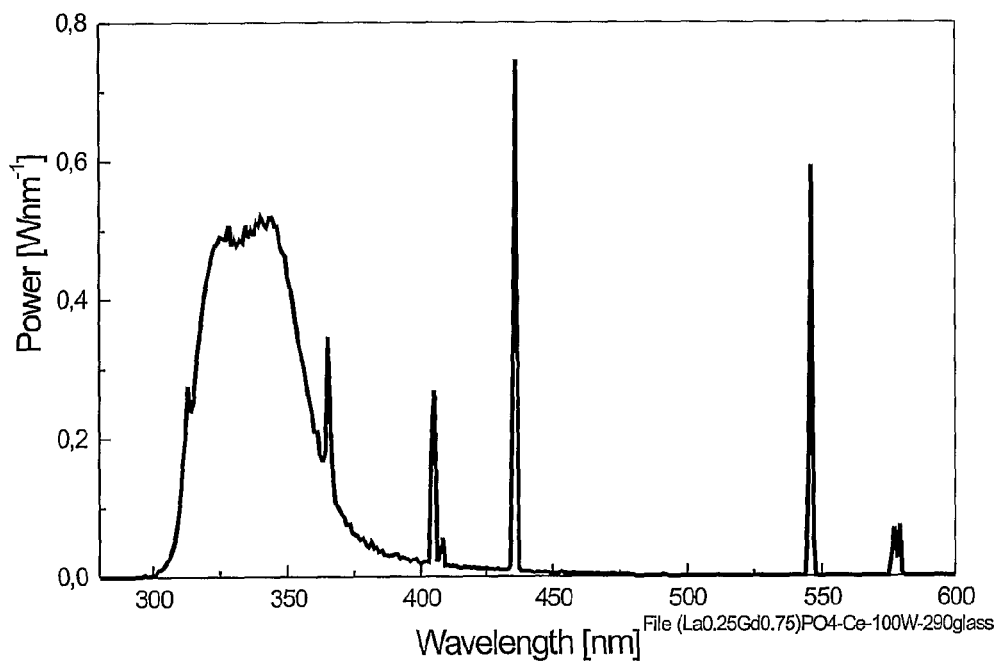
FIG. 4 shows the emission spectrum of UVA/B phosphors as shown in Table 1 that have been filtered by a standard glass.
Figure 5:
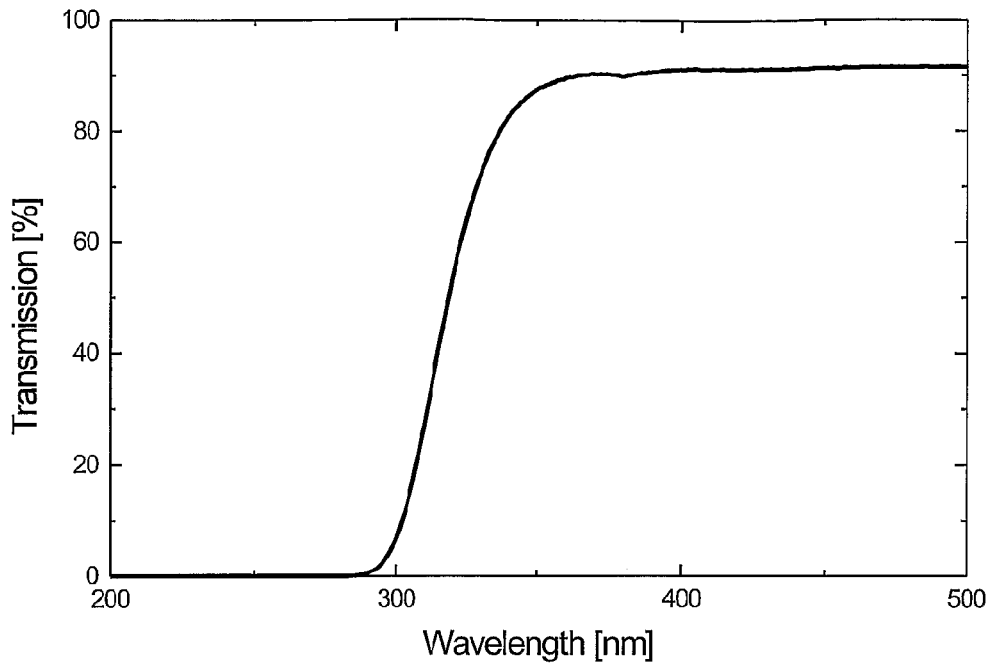
FIG. 5 shows the emission and excitation spectrum of $LaB_3O_6:Bi,Gd$ (Philips Lighting Maarheze U731).
Figure 6:
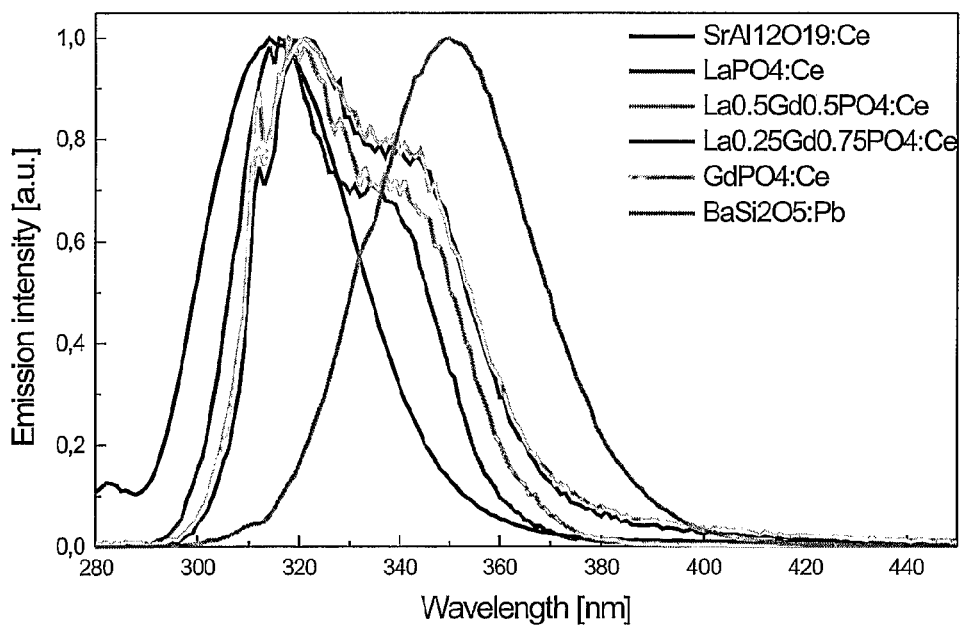
FIG. 6 shows the emission spectrum of standard Philips Lighting tanning lamps: CLEO Professional (solid line), CLEO Advantage (dashed line).

A fluorescent lamp having the phosphor $(La_{0.25}Gd_{0.75})PO_4:Ce$ in standard glass is produced by following the production directions given in Example 3. The emission spectrum is shown in FIG. 2.

The invention claimed is:

1. A fluorescent lamp comprising:
   a gastight glass vessel having a light transmission of 5 to 80% at a wavelength of 312.6 nm, and
   a filling of noble gas, mercury and a layer of a UVB phosphor having a composition of $(La_{0.25}Gd_{0.75})PO_4:Ce$.

2. The fluorescent lamp of claim 1, further comprising UVA phosphor selected from the group consisting of $LaB_3O_6:Bi,Gd, SrAl_{12}O_{19}:Ce, BaSi_2O_5:Pb, LaMgAl_{11}O_{19}:Ce, Sr_2MgSi_2O_7:Pb, (Y,Gd)PO_4:Ce$ and $SrB_4O_7:Eu$ or from a mixture of these phosphors.

* * * * *